(12) United States Patent
Rosa

(10) Patent No.: US 6,301,820 B1
(45) Date of Patent: Oct. 16, 2001

(54) HOOK SETTING FISHING ROD HOLDER

(76) Inventor: Garcia S. Rosa, 313 E. Windhorst Rd., Brandon, FL (US) 33510

( * ) Notice: Subject to any disclaimer, the term of this patent is extended or adjusted under 35 U.S.C. 154(b) by 0 days.

(21) Appl. No.: 09/473,208

(22) Filed: Dec. 27, 1999

(51) Int. Cl.$^7$ ............................................. A01K 97/10
(52) U.S. Cl. ............................................................ 43/15
(58) Field of Search ........................................ 43/15, 16

(56) References Cited

U.S. PATENT DOCUMENTS

| D. 273,689 | 5/1984 | Rhodes | D22/13 |
|---|---|---|---|
| 693,071 | * 2/1902 | Ruud | 43/15 |
| 2,642,690 | * 6/1953 | Soenksen | 43/15 |
| 2,835,065 | * 5/1958 | Schwartzkopf | 43/15 |
| 2,964,868 | * 12/1960 | Bennett | 43/15 |
| 2,986,834 | 6/1961 | Irwin | 43/15 |
| 3,007,275 | 11/1961 | Standley | 43/15 |
| 3,016,648 | * 1/1962 | Ingersoll et al. | 43/15 |
| 3,154,875 | * 11/1964 | Biddison | 43/15 |
| 3,834,055 | * 9/1974 | Bianco | 43/15 |
| 3,874,105 | * 4/1975 | Andree et al. | 43/15 |
| 3,973,346 | * 8/1976 | Mason | 43/15 |
| 3,977,117 | * 8/1976 | Zahner | 43/15 |
| 4,012,861 | * 3/1977 | Gellatly | 43/15 |
| 4,471,553 | * 9/1984 | Copeland | 43/15 |
| 4,676,018 | * 6/1987 | Kimball | 43/15 |
| 4,677,783 | * 7/1987 | Cratsa | 43/15 |
| 4,908,973 | * 3/1990 | Perks | 43/17 |
| 5,383,298 | 1/1995 | Engel | 43/15 |
| 5,542,205 | 8/1996 | Updike | 43/15 |
| 5,903,998 | * 5/1999 | Hawkins et al. | 43/15 |
| 5,930,938 | * 8/1999 | DeFraties | 43/15 |

FOREIGN PATENT DOCUMENTS

WO 96/10330    4/1996   (WO).

* cited by examiner

*Primary Examiner*—Kurt Rowan
(74) *Attorney, Agent, or Firm*—Rudolf O. Siegesmund

(57) ABSTRACT

A rod holder rotatably connected to a mounting having an adjustable array of hooks for connecting rubber bands to the rod holder and a latch trigger which releases when a fish pulls the rod holder downward.

9 Claims, 3 Drawing Sheets

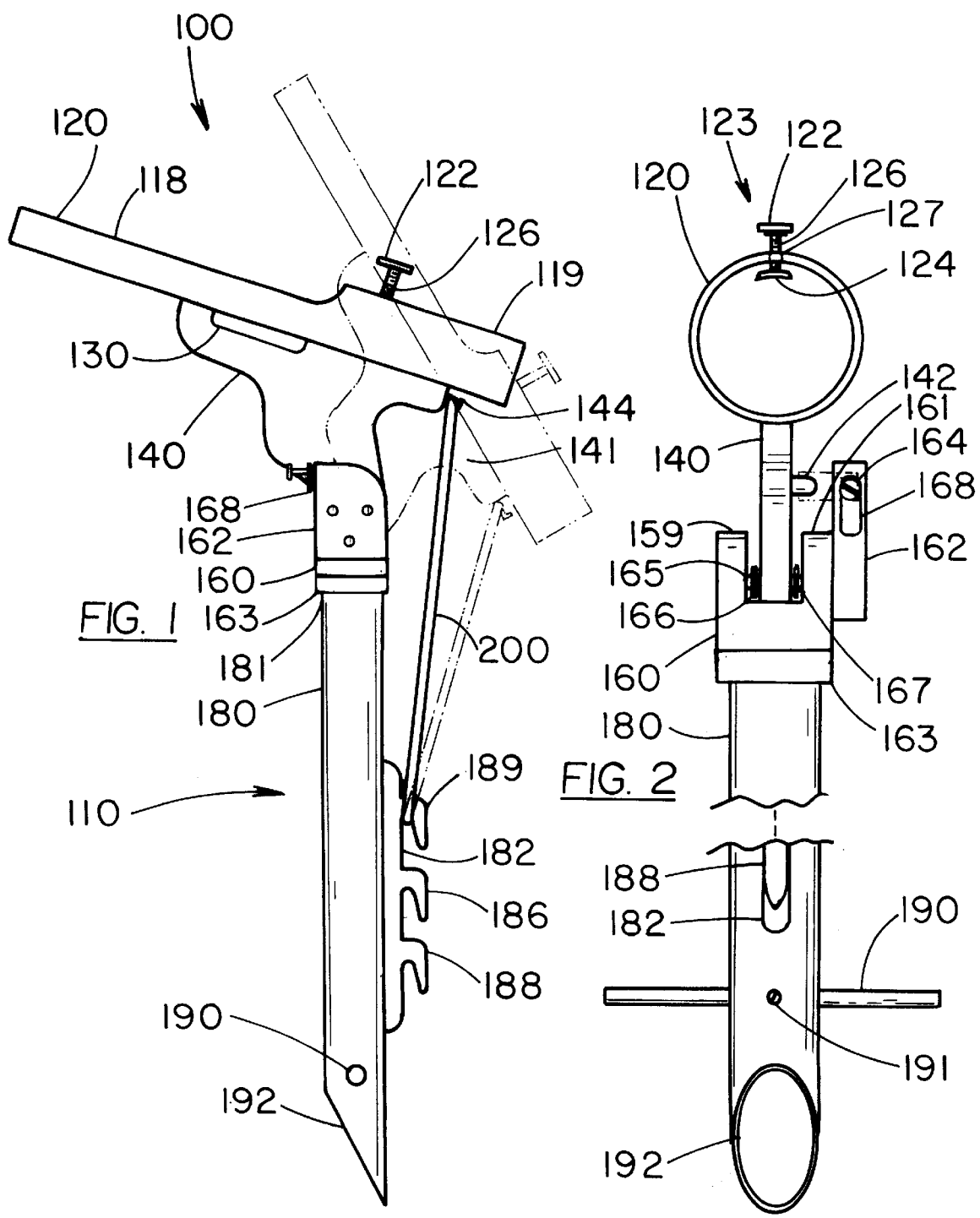

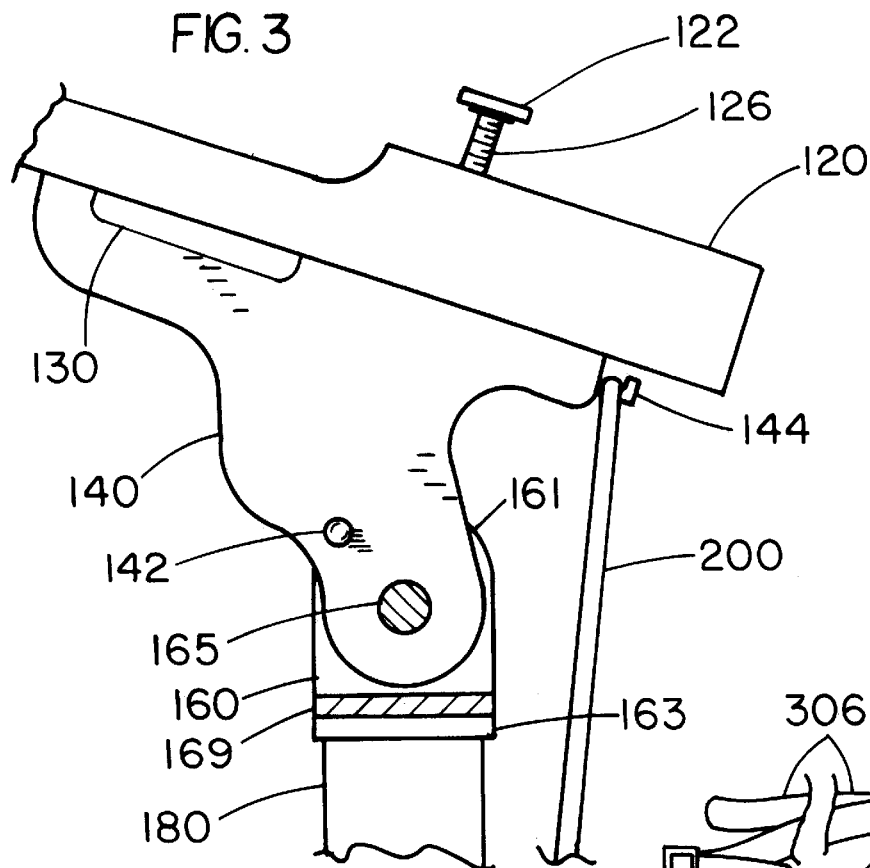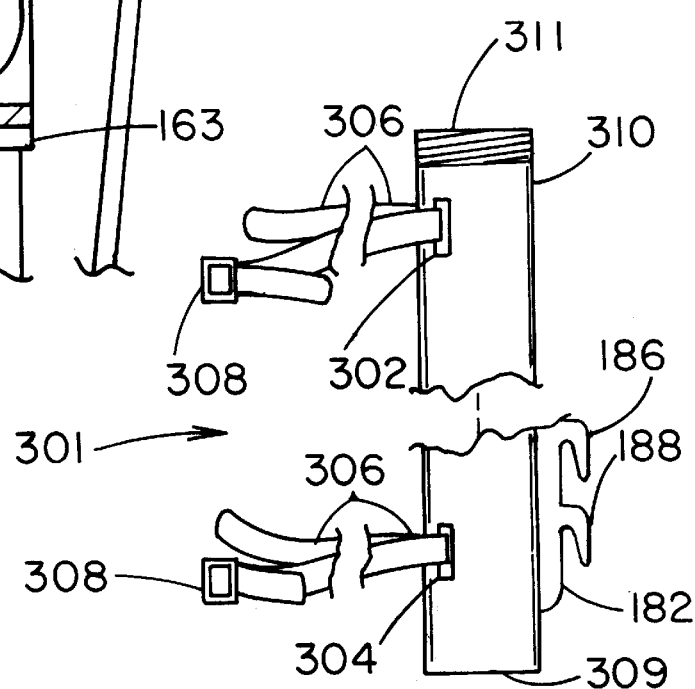

HOOK SETTING FISHING ROD HOLDER

BACKGROUND OF THE INVENTION

1. Field of the Invention

The present invention relates to devices for attachment to a fishing rod for both holding the rod and setting the hook when a fish strikes

2. Description of the Prior Art

The prior art discloses many devices for supporting a fishing rod and for automatically setting the fish hook in the mouth of the fish when the fish bites. These devices usually rely on a latch mechanism which holds the fishing pole down against spring tension. A tug on the line by a biting fish releases the latch mechanism, jerking the pole upward under spring tension and thus setting the hook in the mouth of the fish. Many of these devices are of complex structure which increases the cost and difficulty of use.

U.S. Pat. No. 5,542,205 discloses a rod holder which is pulled upward by a tug on the line releasing latch mechanism which is a roller nut rotatably attached to the holder arm and a pawl ended latch arm pivotally interconnected to the vertical support member.

U.S. Pat. No. 5,383,298 discloses a rod holder connected to a cable which disengages a collapsible linkage mechanism when the rod is pulled down by a fish taking the line. When the collapsible linkage mechanism is released, a spring pulls the rod holder and the rod upward sharply to set the hook. U.S. Pat. No. 3,007,275 discloses a hook setting device with a cam operated trigger mechanism. U.S. Pat. No. 2,986,834 discloses two toggle arms hingedly connected so that when the hinge pin drops below dead center the fishing rod will be jerked upward by a spring connected to one of the toggle arms. All of these devices are made of metal parts which must be machined and assembled raising the cost of manufacture. Moreover, these devices are subject to corrosion in the salt air or else further increased construction expenses for coating of the metal or selection of non-corrosive materials. What is needed is a device of simple design with few parts that can be manufactured from inexpensive, lightweight non-corrosive materials such as plastic or polyvinyl chloride, that can take advantage of rubber bands rather than springs for tension, that be adjustable for several different tension strengths and that can operate on a simple triggering mechanism.

SUMMARY OF THE INVENTION

The present invention meeting the needs identified comprises a rod holder rotatably connected to a mounting having an adjustable array of hooks for connecting rubber bands to the rod holder and a latch trigger which releases when a fish pulls the rod holder downward.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 1 is a left side view of the invention.

FIG. 2 is a rear view of the invention.

FIG. 3 is partial side view of the invention.

FIG. 4 is a side view of a boat support device.

DESCRIPTION OF PREFERRED EMBODIMENTS

Figure 5:
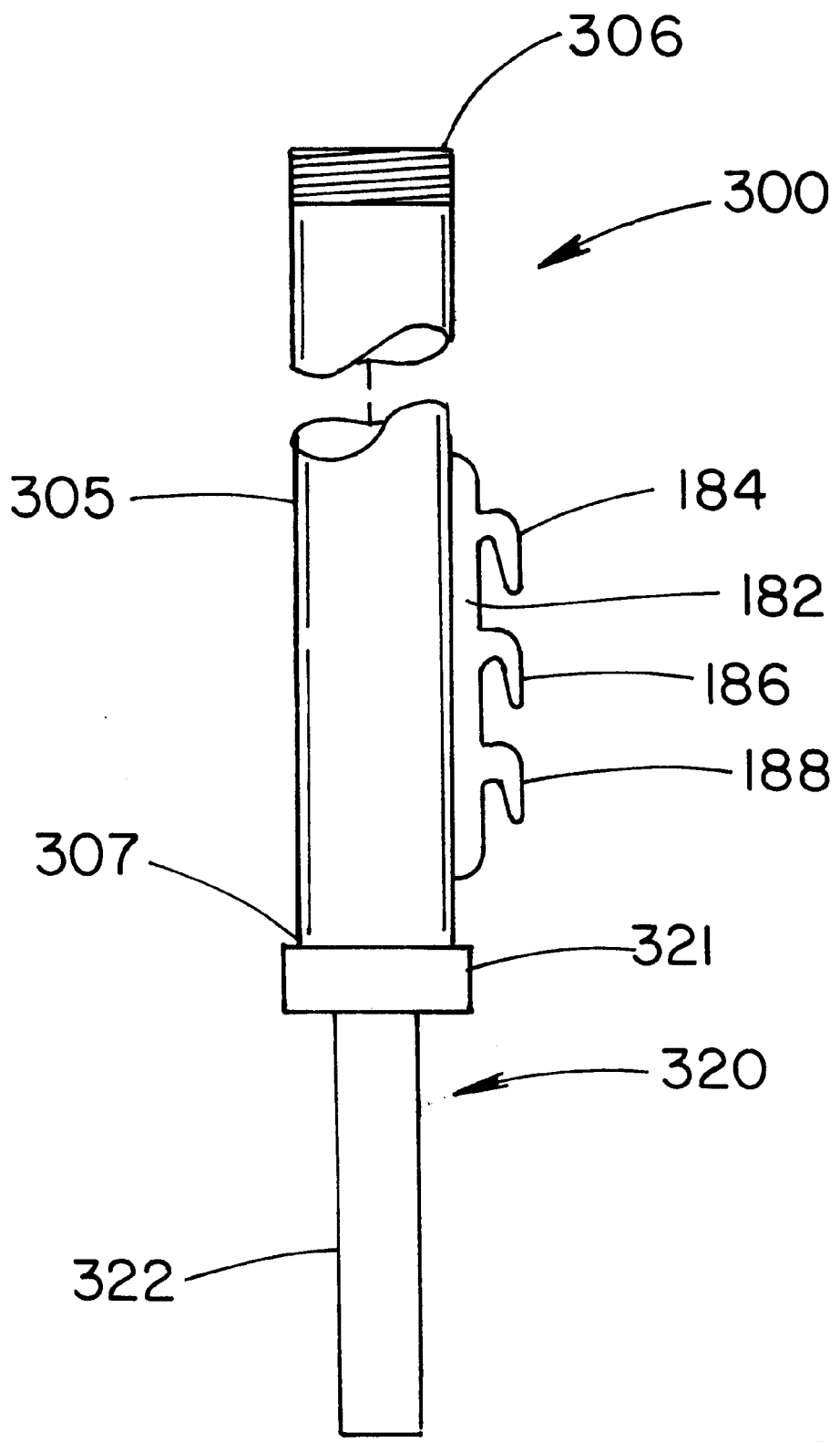
FIG. 5 is a side view of a dock support device.

In FIG. 1, the hook setting device 10 is shown having holder element 100 and stand element 110. Holder element 100 comprises casing 120 and casing leg 140. Casing 120 has securing device 123. Securing device 123 has knob 125 and threaded arm 126. Casing leg 140 is fixedly engaged to casing 120. In the preferred embodiment, casing 120 and casing leg 140 are molded in one piece from the same material such as plastic or polyvinyl chloride. In the preferred embodiment casing leg 140 has casing leg aperture 130 for accommodating bait casting reels. Casing 120 is generally cylindrical in shape with a cut-away portion to facilitate placing the fishing rod handle into casing 120. Casing 120 has a hole (not shown) for receiving threaded arm 126. Casing leg 140 has casing leg hook 144 for receiving band 200. Stand element 110 has base 160, latch support 162, latch 168 and latch securement device 164. Interface 163 is fixedly engaged to base 160. Base support 180 is removably engaged to interface 163 and base 160. In the preferred embodiment, base support 180 has base support first end 181 (located inside interface 163 in FIG. 1). Base support first end 181 is threaded for threaded engagement with threads on the interior of interface 163 (not shown). Persons skilled in the art are aware of alternative ways to removably engage base support 180 to interface 163. Interface 163 may be included in base 160 and it is not necessary that interface 163 be a separate part from base 60. Base support 180 has hook element 182 and foot bar 190. Hook element 182 is fixedly engaged to base support 180. In the preferred embodiment, hook element 182 is molded in one piece with base support 180. Alternatively, hook element 182 can be glued to base support 180. Persons skilled in the art will be aware of further alternative ways to affix hook element 182 to base support 180. Base support 180 has two holes directly opposite to each other for receiving foot bar 190 which extends outward to either side of base support 180 (not shown).

When latch 168 is in a first position or horizontal position, casing leg 140 is in the position shown by the solid lines. When latch 168 moves from the first position or horizontal position, casing leg 140 is free to rotate about base 160 and band 200 will pull down on casing leg hook 144 causing a rod held in casing 120 to jerk upwards rapidly. Casing 120 will then be in a second position shown in dotted lines. In the preferred embodiment hook element 182 has first hook 184, second hook 186 and third hook 188. Band 200 may be connected to first hook 184 for lowest tension, second hook 186 for intermediate tension and third hook 188 for highest tension. The tension achieved can also be varied by the number of bands 200 and strength of bands 200 used.

FIG. 2 depicts an end view of hook setting device 10. Casing 120 has cutaway section 118 (See FIG. 1) and uncut section 119. Viewing casing 120 from the rear, the profile of uncut section 120 is generally circular and is intended for receiving the fishing rod handle. Threaded arm 125 extends though threaded hole 127 in casing 120 ending in pressure plate 124. By turning knob 122, threaded arm 126 will rotate in threaded hole 127 and either raise or lower pressure plate 127 depending on the direction in which knob 122 is rotated. By lowering pressure plate 124 until pressure plate 124 contacts the handle of the fishing rod, the fishing rod can be secured within casing 120. Casing leg 140 has casing leg arm 142 extending outward perpendicularly to casing leg 140. Casing leg arm 142 is fixedly engaged to casing leg 140. In the preferred embodiment, casing leg 140 is molded from in one piece with casing leg 140 and casing 120. Alternatively, casing leg arm 142 can be inserted into a hole in casing leg 140 or a screw or bolt inserted into casing leg 140 could be utilized. Casing leg arm 142 extends outward from casing leg 140 a sufficient distance to allow engagement by latch 168. The length of casing arm 142 will be less than the distance between casing leg 140 and latch support 162. Latch 168 is rotatably engaged to latch support 162 by screw 164 which passes through a latch hole (not shown) in latch 168 and engages a latch hole support hole (not shown) in latch support 162. In the preferred embodiment, latch support 162 is fixedly engaged to base 160 by permanent adhesive. Alternatively, latch support 162 may be affixed to base 160 by a plurality of screws. Base 160 is generally "U" shaped and has a base right arm 161 and a base left arm 159. Base cylinder 165 passes through base right arm 161, first washer 167, casing, arm 142, washer 166 and base left arm 159. In the preferred embodiment, a hole is drilled through base right arm 161 and partially through base left arm 159 so that the hole does not exist outer surface of base left arm 159. A hole is drilled in casing leg 140 and base cylinder 165 is passed through base right arm 162, first washer 167, casing leg 140, second washer 166 and inserted into the hole in base left arm 159. Latch support 162 is then affixed to base 160 which seals base cylinder 165 is permanently held in position. Alternatively, latch support 162 can be removably affixed to base 160 so that base cylinder 165 can be replaced if it breaks. Base support 180 is removably engaged to base 160. In the preferred embodiment, base support 180 is threadingly engaged to base 160. Base support 180 has base support second end 192 which is cut at an angle to provide a penetrating point so that hook setting device 10 can be placed in sand or soil by pressing base support 180 into the sand or soil. To aid in pressing base support 180 into the sand or soil, base support 180 has foot bar 190 which passes through foot bar holes (not shown) in base support 180. Foot bar 190 is fixedly engaged to base support 180 by retaining screw 191. Alternatively, foot bar 190 may be removed by removing retaining screw 190 and withdrawing foot bar 190 from base support 180. In the preferred embodiment, base support 180 is approximately 25 and ¼ inches long and made from 2" polyvinyl chloride (PVC) pipe and casing 120 is made from a 13" long portion of 2" PVC pipe cutout as shown in FIG. 1. In the preferred embodiment, foot bar 190 is a 10 and ¼ inch ¾ inch conduit rod and is positioned through base support 180 approximately 6 and ½ inches from the bottom of base support 180.

FIG. 3 depicts a partial view of base 160 with base left arm 159 cut away to reveal the positioning of base cylinder 165 and casing leg arm 142.

FIG. 4 depicts accessory 301 for adapting hook setting apparatus 10 for employment at a dock with railings. Accessory 301 has dock base support 310. Dock base support 310 has dock base support first end 311 which is threaded for engagement with interface 163 (not shown in FIG. 5). Dock base support 310 has first strap holes 302 and second strap holes 304 for receiving straps 306. Straps 306 have securement device 308. Securement device 308 could be a buckle, a velcro connector or other means of engaging the free ends of straps 306 around surface for holding accessory 300. For example, accessory 300 could be affixed to a railing at a pier to hold dock base support 301 in a vertical position. Hook element 182 is located on dock base support 310 at the same distance from interface 163 as hook element 182 is located from interface 163 on base support 180 thereby ensuring uniformity of tension by band 200.

FIG. 5. depicts accessory 300 for adapting hook setting device 10 for use on a boat. In order to utilize hook setting device 10 on a boat, boat base support 305 is substituted for base support 180 by removing base support 180 and installing base support 305. Boat base support 305 has base support first end 306 which is threaded for threaded engagement with interface 163 (not shown in FIG. 5). Boat base support 305 has boat base support second end 307 which is adapted for fitting into a standard rod holder. Rod holder adapter 320 has rod holder adapter interface 321 which is threaded for receiving boat base support second end 307. Rod holder adapter interface is fixedly or removably engaged with fixture 322. In the preferred embodiment, fixture 322 is an 8 inch long 1 inch Hook element 182 is fixedly engaged to boat base support 305. In the preferred embodiment, hook element 182 is molded in one piece with boat base support 305. Alternatively, hook element 182 can be glued to boat base support 305. Persons skilled in the art will be aware of further alternative ways to affix hook element 182 to boat base support 305. Hook element 182 is located on boat base support 305 at the same distance from interface 163 as hook element 182 is located from interface 163 on base support 180 thereby ensuring uniformity of tension by band 200.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. An apparatus for holding a fishing rod and for automatically setting a hook by jerking the rod upwards when a fish bites, comprising:

a holder element having a casing, a casing leg fixedly engaged to said casing and a casing leg arm fixedly engaged at an approximate right angle to said casing leg;

a casing leg hook fixedly engaged to said casing leg;

a base element rotatably connected to the holder element;

a band removably engaged to the holder element and the base element;

a latch support fixedly engaged to the base element;

a latch rotatably engaged to the latch support;

wherein tension from said band holds said latch against said casing leg arm;

wherein, when said latch moves from a horizontal position, said casing leg rotates about said base and said band pulls said casing hook leg toward said hook element; and wherein said base element further comprises a base cylinder passing through a base right arm, said casing leg arm and a base left arm.

2. The apparatus of claim 1 further comprising a latch securement device removably engaged to said latch.

3. The apparatus of claim 1 further comprising a hook element having a plurality of hooks fixedly engaged to a base support having a first end and a second end; wherein said second end has a penetrating point; and wherein said first end is removably engaged to said base element.

4. The apparatus of claim 1 further comprising:

a boat base support; and a rod holder adapter;

wherein said boat base support is adapted for removable engagement to said base element and said rod holder adapter is adapted for removable engagement to said boat base support.

5. The apparatus of claim 1 further comprising a dock base support wherein said base support is removably engaged to said base element.

6. An apparatus for holding a fishing rod having a handle and for automatically setting a hook by jerking the rod upwards when a fish bites, comprising:
   a holder element comprising a casing, a casing leg fixedly engaged to said casing, and a casing leg arm fixedly engaged at an approximate right angle to said casing leg;
   a casing leg hook fixedly engaged to said casing leg;
   said casing having a threaded hole and a threaded arm rotatably engaged in said threaded hole;
   said threaded arm having a first end with a knob affixed thereto and a second end with a pressure plate affixed thereto;
   a base element rotatably connected to the holder element, said base element having a base cylinder passing through a base right arm, said casing leg arm and a base left arm;
   a band removably engaged to the holder element and the base element;
   a latch support fixedly engaged to the base element;
   a latch rotatably engaged to the latch support and a latch securement device;
   a hook element having a plurality of hooks fixedly engaged to said base; and
   a base support removably engaged to said base;
   wherein said casing leg has a casing leg aperture adapted for receiving a bait casting reel;
   wherein tension from said band holds said latch against said casing leg arm;
   wherein, when said latch moves from a horizontal position, said casing leg rotates about said base and said band pulls said casing leg hook toward said hook element; and
   wherein, said handle is secured within said casing by turning said knob until said pressure plate contacts the handle.

7. The apparatus of claim 6 wherein said base support is a dock base support having a dock base support first end adapted for removable engagement with said base element, a plurality of strap holes and a plurality of straps adapted for passage through said strap holes.

8. The apparatus of claim 6 wherein said base support is a boat base support having a boat base support first end adapted for removable engagement with said base element and a boat base second end adapted for removable engagement with a rod holder adapter.

9. A system for holding a fishing rod having a handle and for automatically setting the hook by jerking the rod upwards when a fish bites on the beach, on a dock or in boat, comprising:
   a holder comprising a casing, a casing leg fixedly engaged to said casing, and a casing leg arm fixedly engaged at an approximate right angle to said casing;
   a casing leg hook fixedly engaged to said casing leg;
   said casing having a threaded hole and a threaded arm rotatably engaged in said threaded hole;
   said threaded arm having a first end with a knob affixed thereto and a second end with a pressure plate affixed thereto;
   a base rotatably connected to the holder, said base having a base cylinder passing through a base right arm, said casing arm and a base left arm;
   a band removably engaged to the holder element and the base element;
   a latch support fixedly engaged to the base;
   a latch rotatably engaged to the latch support and a latch securement device;
   a hook element having a plurality of hooks fixedly engaged to said base;
   a base support;
   a boat base support;
   a dock base support; and
   a rod holder adapter adapted for removable engagement with said boat base support;
   wherein said base support, said boat base support, and said dock base support are capable of removable engagement with said base;
   wherein said casing leg has a casing leg aperture adapted for receiving a bait casting reel;
   wherein tension from said band holds said latch against said casing leg arm;
   wherein, when said latch moves from a horizontal position, said casing leg rotates about said base and said band pulls said casing hook toward said hook element;
   wherein, said handle is secured in said casing by turning said knob until said pressure plate contacts the handle;
   wherein said base support has a first end adapted for removable engagement to said base and a second end having a penetrating point;
   wherein said boat base support is adapted for removable engagement to said base and said rod holder adapter is adapted for removable engagement to said boat base support; and
   wherein said dock base support has a dock base support first end adapted for removable engagement with said base element, a plurality of strap holes and a plurality of straps adapted for passage through said strap holes.

* * * * *